US009732480B2

(12) United States Patent
Puffer, Sr. et al.

(10) Patent No.: US 9,732,480 B2
(45) Date of Patent: Aug. 15, 2017

(54) PELLETIZING SYSTEM FOR ROAD SURFACE MARKING MATERIAL

(71) Applicants: Daniel John Puffer, Sr., Madisonville, LA (US); Lam Thanh Nguyen, Harvey, LA (US)

(72) Inventors: Daniel John Puffer, Sr., Madisonville, LA (US); Lam Thanh Nguyen, Harvey, LA (US)

( * ) Notice: Subject to any disclaimer, the term of this patent is extended or adjusted under 35 U.S.C. 154(b) by 482 days.

(21) Appl. No.: 14/270,068

(22) Filed: May 5, 2014

(65) Prior Publication Data

US 2015/0314485 A1 Nov. 5, 2015

(51) Int. Cl.
| | | |
|---|---|---|
| *B29B 9/10* | (2006.01) | |
| *B29B 13/04* | (2006.01) | |
| *E01F 9/506* | (2016.01) | |
| *B29K 101/12* | (2006.01) | |
| *B29B 9/06* | (2006.01) | |
| *E01F 9/50* | (2016.01) | |
| *B29B 9/12* | (2006.01) | |
| *B29K 509/08* | (2006.01) | |
| *B29K 105/16* | (2006.01) | |

(52) U.S. Cl.
CPC ............... *E01F 9/506* (2016.02); *B29B 9/10* (2013.01); *B29B 13/045* (2013.01); *B29B 9/06* (2013.01); *B29B 9/12* (2013.01); *B29B 13/04* (2013.01); *B29K 2101/12* (2013.01); *B29K 2105/16* (2013.01); *B29K 2509/08* (2013.01); *B29K 2995/003* (2013.01); *E01F 9/50* (2016.02)

(58) Field of Classification Search
CPC .. E01F 9/506; E01F 9/50; B29B 9/065; B29B 9/10; B29B 9/12; B29B 13/04; B29B 13/045; B29B 9/06; B29K 2101/12; B29K 2995/003; B29K 2509/08; B29K 2105/16
USPC ............ 425/378.1, 378.2, 379.1, 130, 131.1, 425/131.5, 132, 133.1, 133.5, 134
See application file for complete search history.

(56) References Cited

U.S. PATENT DOCUMENTS

| | | | | |
|---|---|---|---|---|
| 3,520,027 | A * | 7/1970 | Bird | ..................... B29C 45/0005 264/116 |
| 4,521,541 | A * | 6/1985 | Rutherford | ............. A61L 9/042 106/243 |
| 5,267,845 | A * | 12/1993 | Anderlind | ................. B29B 9/06 264/143 |
| 5,861,117 | A * | 1/1999 | Rosenbaum | ........ B29B 17/0026 264/148 |
| 5,928,716 | A | 7/1999 | Finley | |
| 5,972,421 | A | 10/1999 | Finley | |
| 7,186,102 | B2 * | 3/2007 | Laver | ..................... B27N 3/005 425/133.5 |

(Continued)

FOREIGN PATENT DOCUMENTS

WO WO9738835 A1 10/1997

*Primary Examiner* — Seyed Masoud Malekzadeh
(74) *Attorney, Agent, or Firm* — Keaty Law Firm, LLC

(57) ABSTRACT

The invention relates to pelletizing thermoplastic road marking substance containing light-reflective agents, such as glass beads. A dry formulation of the ingredients is transported to a heating station, where the dry mix is heated to a molten state. The melted mix is extruded into form pockets of a moving conveyor. As the conveyor moves through a cooling station, the molten substance in the form pockets solidifies forming individual pellets. The pellets are then removed from the form pockets, packaged and shipped to customers.

15 Claims, 5 Drawing Sheets

(56) References Cited

U.S. PATENT DOCUMENTS

| | | | | |
|---|---|---|---|---|
| 7,458,798 B2* | 12/2008 | Weber | ................ | B29C 47/8895 |
| | | | | 425/144 |
| 7,771,635 B2* | 8/2010 | Boothe | ................ | B29B 9/065 |
| | | | | 165/177 |
| 2003/0183972 A1* | 10/2003 | Weber | ................ | B29C 47/8895 |
| | | | | 264/85 |

* cited by examiner

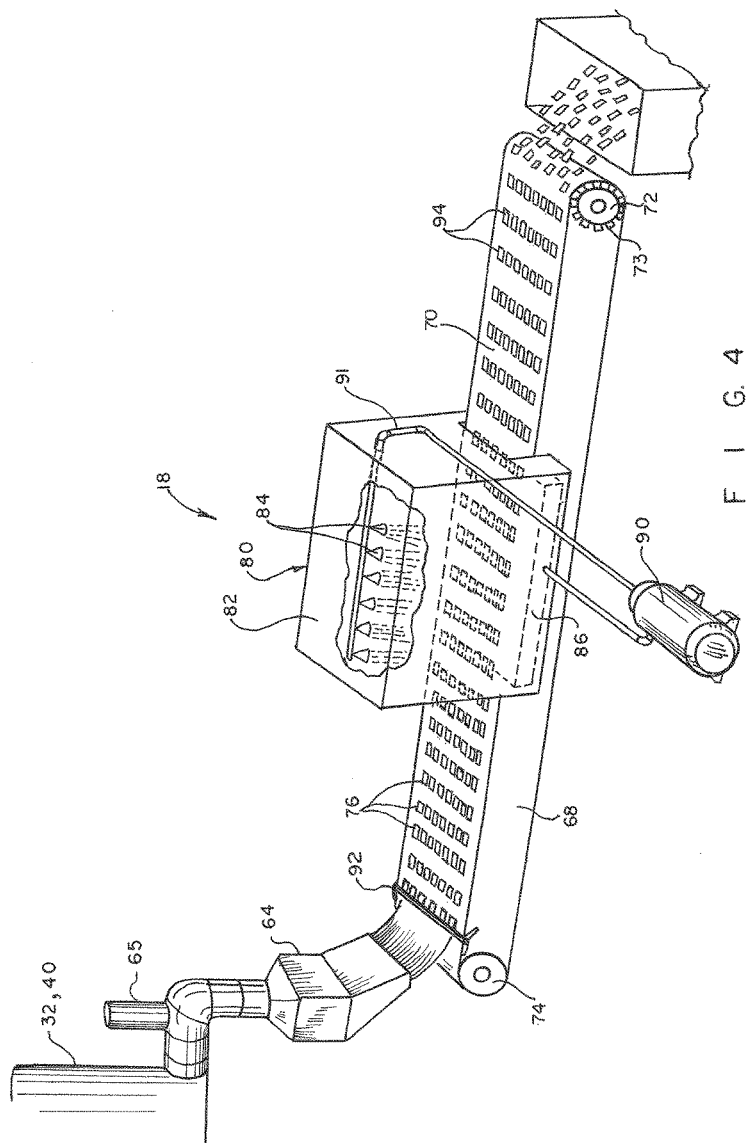
F I G. 4

PELLETIZING SYSTEM FOR ROAD SURFACE MARKING MATERIAL

BACKGROUND OF THE INVENTION

Road surface markings are used on paved roadways to provide guidance and information to drivers and pedestrians. Road surface markings can be formed using mechanical or non-mechanical devices. Mechanical road surface markers may be raised or recessed into the road surface, and can be either reflective or non-reflective. Examples of mechanical markers are Botts' dots and rumble strips. Non-mechanical markers may be formed by paint, thermoplastic, preformed polymer tape, epoxy and other methods.

Thermoplastic markers are some of the most common types of road marking based on their balance between cost and performance longevity. Thermoplastic binder systems are generally based on one of three core chemistries: hydrocarbons, rosin esters, and maleic modified rosin esters (MMRE). Thermoplastic coatings are generally homogeneous dry mixes of binder resins, plasticizers, glass beads (or other optics), pigments, and fillers. These types of markers demonstrate increased durability, lasting 3 to 6 years, and retro-reflectivity.

Thermoplastic markings are applied using road marking machines, which preheat powdered mix to about 200° C. and then feed the heated material to the application apparatus. Immediately after the thermoplastic has been applied, glass beads are laid onto the hot material so that they embed before the plastic hardens. These beads provide initial retroreflection. As the marking wears during use and the initial beads are lost, the beads mixed with the binder are uncovered, providing long term retroreflectivity.

Conventional thermoplastic mix is supplied in powdered form, which makes it difficult to load into the road marking machine. The technicians have to strictly follow safety regulations and use special equipment when preparing the marking mix. The present invention contemplates elimination of drawbacks associated with conventional methods of preparing road marking material and provision of a system for pelletizing the road marking material this eliminating or significantly minimizing hazards associated with dust produced by powdered mix.

SUMMARY OF THE INVENTION

It is, therefore, an object of the present invention to provide a system for pelletizing material that can be used for creating thermoplastic road markers.

It is another object of the invention to provide a pelletizing system capable of pelletizing a mixture of raw materials with embedded reflective elements.

It is a further object of the invention to provide a system of pelletizing powdered materials, while mixing the powdered materials with reflective elements.

These and other objects of the invention are achieved through a provision of a system and method for pelletizing thermoplastic road marking material. The system has a mixing section configured to mix a plurality of materials suitable to form a dry mixture for formulating a thermoplastic road marking substance, which contains a light-reflective agent, such as glass beads. The system also has a melting section, where the dry mixture is heated to a pre-determined degree sufficient to melt the dry mixture and form a homogenous melted thermoplastic road marking substance containing glass beads. The molted mixture is deposited into form pockets in a pelletizing section, where the molted mixture is cooled as it is progressively moved along a conveyor.

As the thermoplastic substance is cooled it solidifies to form individual pellets containing glass beads. The pellets are packed and shipped to a customer, where the pellets are expected to be melted again before the thermoplastic road markings are formed on the roadways.

BRIEF DESCRIPTION OF THE DRAWINGS

Reference will now be made to the drawings, wherein like parts are designated by like numerals, and wherein

FIG. 4 is a schematic view of a pelletizing section of the system of the present invention.

DETAIL DESCRIPTION OF THE INVENTION

Figure 1:
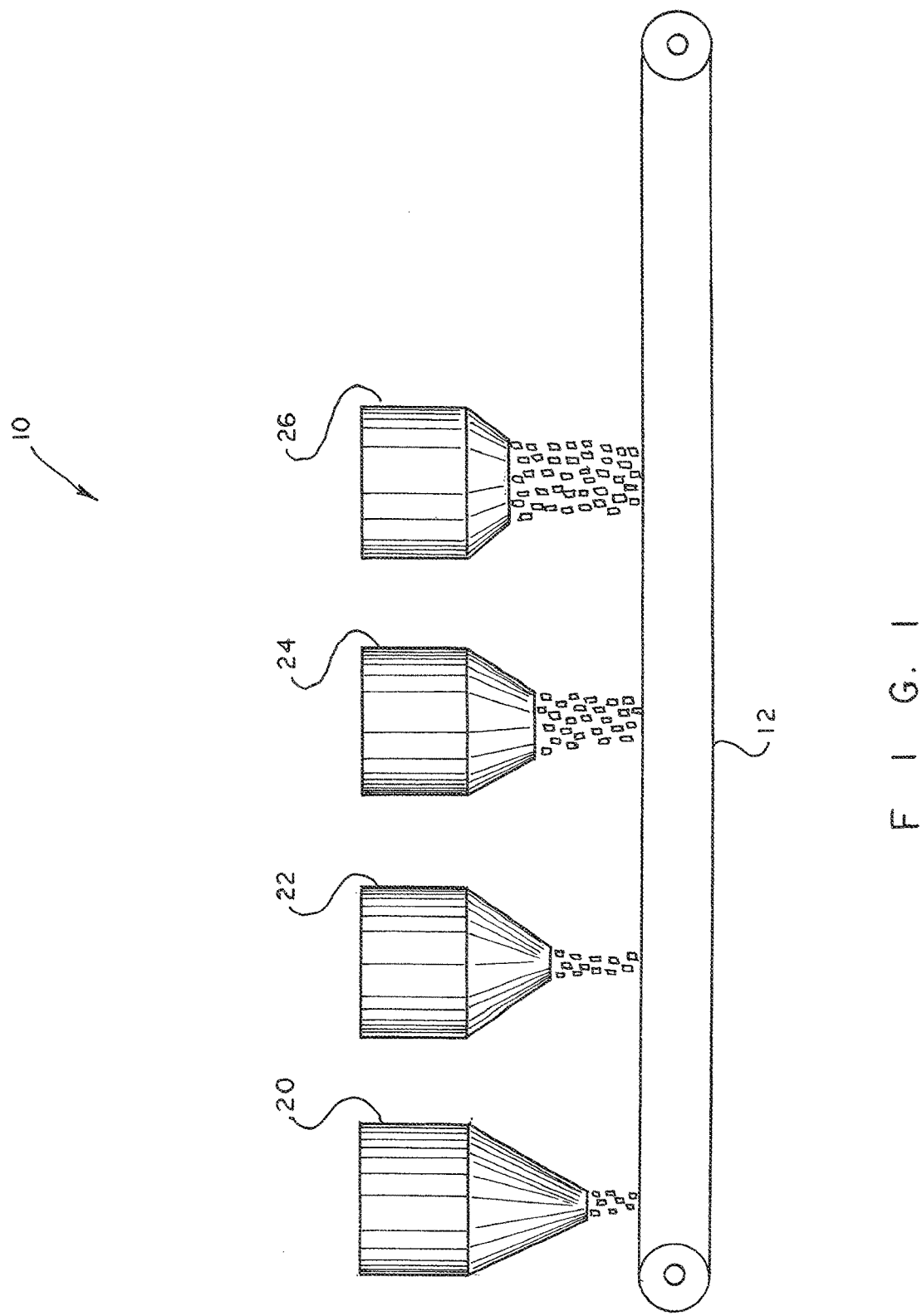
FIG. 1 is a schematic view of a mixing section of the system of the present invention.

Turning now to the drawings in more detail, numeral 10 designates a mixing section of the system of the present invention. The section 10 includes a first belt conveyor (mixing conveyor) 12 configured for transporting individual components of a road marking mix to a melting section 16. The mixing conveyor 12 can be powered by a hydraulic, electrical or other mechanical power means. A plurality of storage containers are mounted adjacent the mixing conveyor 12; the containers hold a pre-determined quantity of separate ingredients, which are deposited onto the conveyor. The component materials in the mixing section can be in the form of powder, granules, or solid particles.

In one exemplary embodiment, a storage container 20 holds a pre-determined quantity of a filler material, such as calcium carbonate. A storage container 22 holds a pre-determined quantity of a thermoplastic binder substance, including waxes, anti-setting agents, and the like. A storage container 24 holds a pre-determined quantity of a pigment, which can be titanium dioxide, and a storage container 26 holds a pre-determined quantity of an optical reflecting material, such as glass beads. The paint mix may contain other ingredients, which are mixed with the basic filler-binder-pigment-reflector mix use in this description of the system. Additional containers with optional ingredients can be positioned adjacent the mixing conveyor 12 for mixing the optional ingredients in the mixing section 10. In one exemplary embodiment, the thermoplastic binder is present in the dry mixture in the amount of about 20% by weight, with 80% by weight being filled with the filler, pigment, and glass beads.

Ground calcium carbonate (also called ground limestone, whiting, or chalk) is the most widely used extender mineral in coatings applications. It is available worldwide and close to most paint manufacturing locations. It is considered the most economical of all common filler minerals. Other filler materials may be used as well.

Conventional binders of thermoplastic road markings consist of low molecular weight petroleum based resins or rosin derivatives optionally mixed with a plasticizer to reduce the brittle nature of the resin by reducing the glass transition temperature of the binder. The binders provide toughness, flexibility and bond strength while holding all the components together. The low molecular weight of these binder ingredients results in a relatively low abrasion resistance of the road marking. Some binders may contain a copolymer designed to improve the mechanical properties of the binder, which increases the performance life time of the road marking.

The thermoplastic paint mixture usually contains some type of a pigment, which gives the finished product white or yellow color, depending on the intended use. Titanium dioxide is the most widely used white pigment because of its brightness and very high refractive index. $TiO_2$ is also an effective opacifier in powder form, where it is employed as a pigment to provide whiteness and opacity to the thermoplastic paint suitable for road markings. In paint, it is often referred to as "the perfect white", "the whitest white", or other similar terms.

The reflective material contained in the storage container 26, such as glass beads, is designed to be mixed with the other paint ingredients prior to stripping the road. As the paint layers wear, the beads are exposed giving the enhanced visibility of road markings. In many conventional road marking paints, the glass beads are spheres having a diameter measuring a fraction of a millimeter.

The storage containers 20, 22, 24, and 26 can be hoppers having an inlet opening suitable for loading the powder material and an outlet configured for dispensing a predetermined quantity of the dry components of the marking mix onto the mixing conveyor 12. In some embodiments, the dispensing outlet can be mounted above the conveyor for dispensing the ingredients by gravity.

Figure 2:
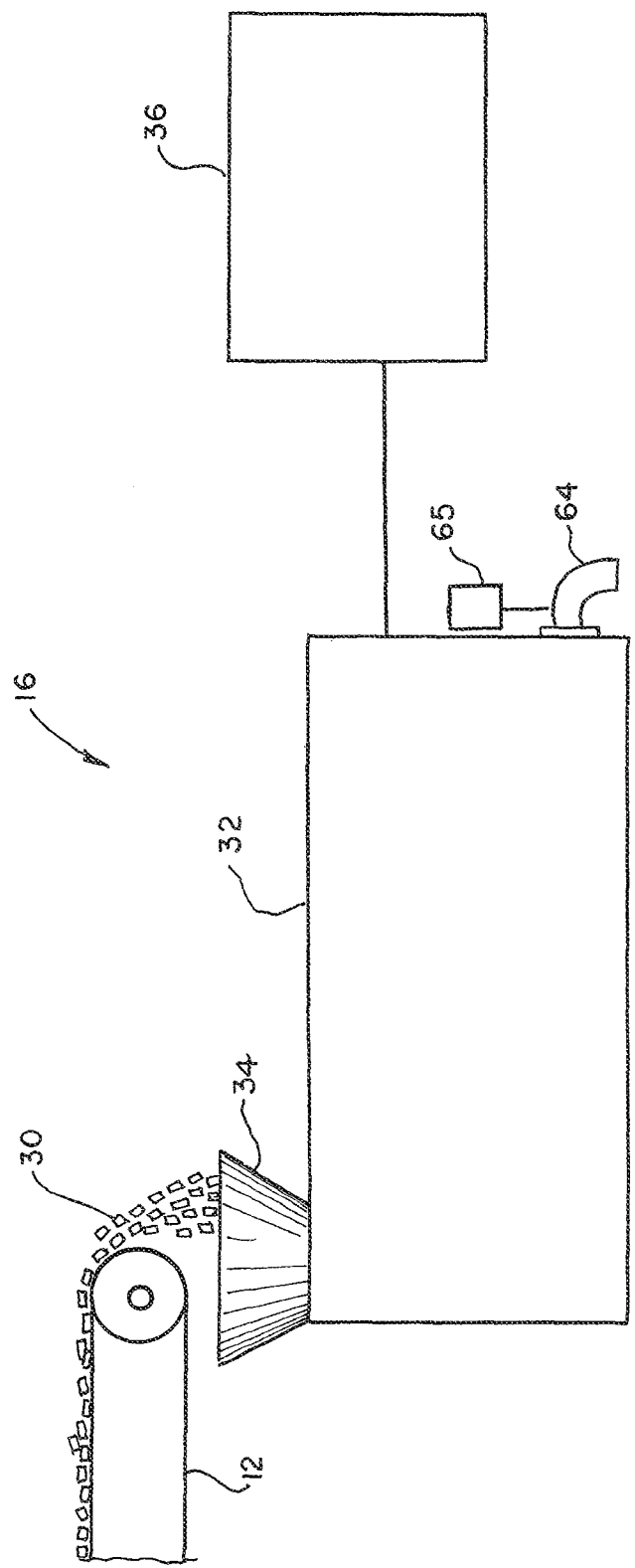
FIG. 2 is a schematic view of a heating/melting section of the system of the present invention.

The dry mixture 30 containing the filler, thermoplastic binder, a pigment, and glass particles is transported by the mixing conveyor 12 to the melting section 16 of the system 10. In the embodiment shown in FIG. 2, the dry mixture 30 is loaded into a microwave melting unit 32 through an inlet funnel 34. The melting unit 32 is operationally connected to a computer controller 36, which regulates the dry mixture heating process, which takes place in the melting unit 32. In one exemplary embodiment, the heating/melting unit is capable of heating the dry mixture to above Ring-and-Ball softening point. It is envisioned that the Ring-and-Ball softening point for the thermoplastic mixture is between 200 degrees Fahrenheit and 230 degrees Fahrenheit. The heating unit of the present invention is configured to heat the dry mixture to between 300 degrees Fahrenheit and 450 degrees Fahrenheit.

Figure 3:
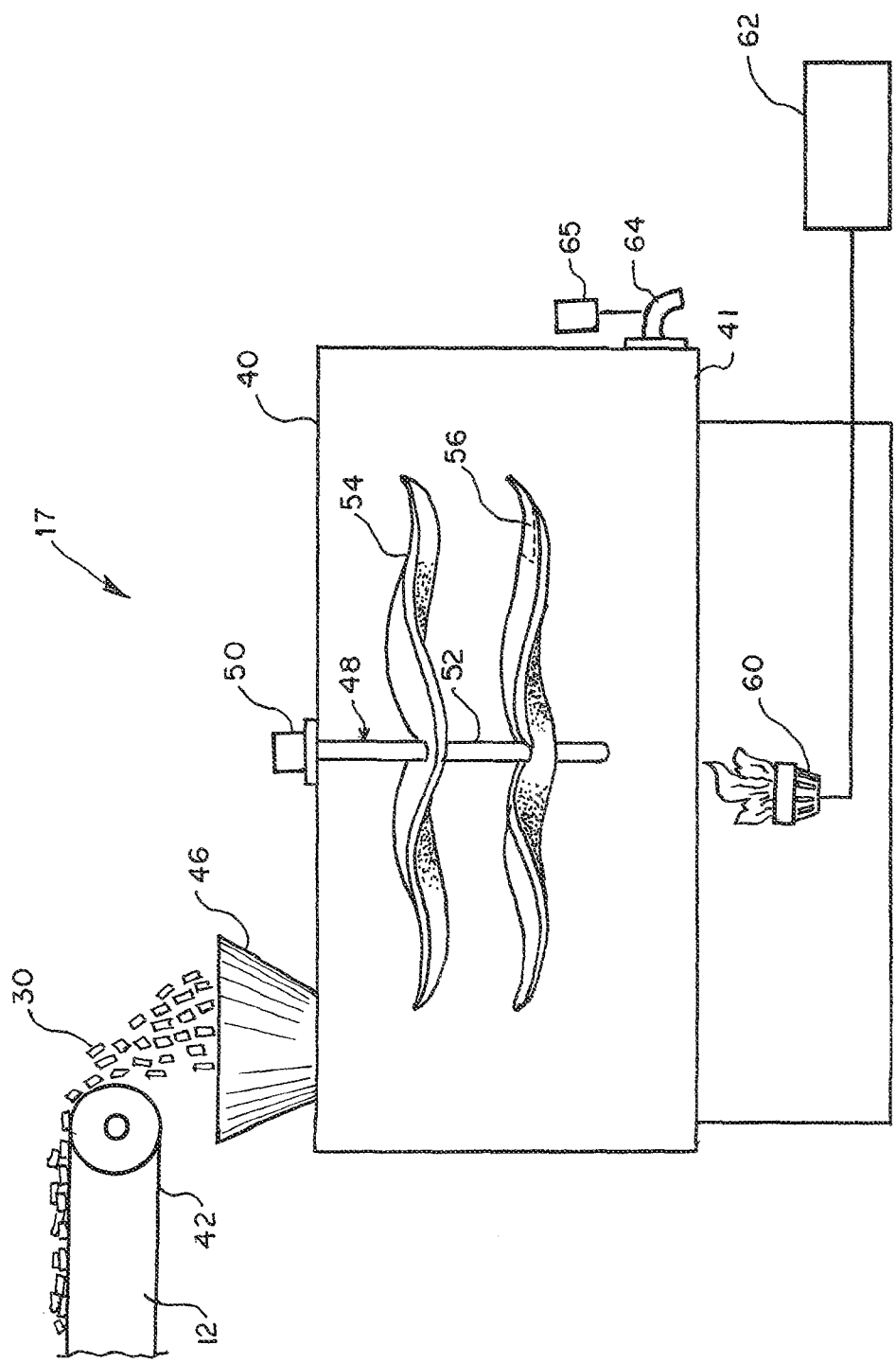
FIG. 3 is a schematic view of an alternative heating/melting section of the system of the present invention.

An alternative melting section 17 is illustrated in FIG. 3. In this embodiment, a melting tank 40 is positioned at a dispensing end 42 of the mixing conveyor 12. An inlet funnel 46 of the melting tank 40 is mounted to receive the dry mixture 30. An agitator 48 is mounted in the tank 40. The agitator 48 is operationally connected to a power source, such as an electric motor 50, which imparts rotational force on the agitator shaft 52. One or more agitator blades 54, 56 are carried by the agitator shaft 52. As the blades rotate within the melting tank 40, the dry mixture 30 is stirred and mixed during the melting process to form a homogenous molten mix.

A heat source 60 is mounted below a bottom wall 41 of the tank 40 for heating the mixture 30 loaded into the tank 40. The heat source 60 can be a burner unit, which uses propane or natural gas. The burner unit 60 is connected to the source of gas 62, which supplies sufficient flammable fuel for heating and melting the dry mixture 30 in the tank 40.

In one exemplary embodiment, the heating/melting unit is capable of heating the dry mixture to above Ring-and-Ball softening point. It is envisioned that the Ring-and-Ball softening point for the thermoplastic mixture is between 200 degrees Fahrenheit and 230 degrees Fahrenheit. The heating unit of the present invention is configured to heat the dry mixture to between 300 degrees Fahrenheit and 450 degrees Fahrenheit.

As shown in FIG. 4, each of the melting units 32 and 40 is provided with dispensing head or dispensing conduit 64. An electronically controlled gate valve 65 is operationally connected to the dispensing conduit 64 for controlling dispensing of melted mix from the melting units 32 and 40. The homogenous melted mix is transported through the dispensing conduit 64 to a pellet-forming section 18.

The pellet-forming section 18 comprises a second belt conveyor 68 positioned in close proximity to the dispensing conduit 64 of the melting units 32 or 40. The second belt conveyor 68 has an endless loop belt 70 which is rotated between a drive pulley 72 and an idler pulley 74. The second conveyor belt 70 is formed from a flexible plastic material, such as silicone. A plurality of form pockets 76 is formed along substantially entire surface of the second conveyor belt 70. In one exemplary embodiment, the pockets 76 are ¼" in size and are spaced 3/16" apart.

A cooling station 80 is mounted along the path of the second belt conveyor 68. The cooling station 80 comprises an enclosure 82, within which a plurality of spray units or spray heads 84 is mounted. A coolant collection tray 86 is provided on the bottom of the enclosure 86. A re-circulating pump 90 is fluidly connected via suitable conduits 91 between the coolant collection tray 86 and the spray heads 84; the pump 90 re-circulates the cooling liquid, which is sprayed from the spray units onto the second conveyor belt 70 and collected in the coolant collection tray 86. In one exemplary embodiment, the coolant is water retained at ambient temperature.

A spreader 92 is positioned in contact with the second conveyor belt 70 adjacent the idler pulley 74 and immediately adjacent the dispensing conduit 64. The spreader extends transversely to the conveyor belt path. As the melted mix exits the dispensing conduit 64 it is deposited into the pockets 76 of the second conveyor belt 70. The spreader 92 runs along the top of the pockets 76 and helps in evenly distributing the melted mix in the pockets 76.

As the melted mix moves along the path of the second conveyor belt it passes through the cooling station 80. The cooling liquid, which can be cold water, cools the melted mix and causes the melted mix to harden. In one exemplary embodiment, when the melted road marking mixture is cooled below 115 degrees Fahrenheit it solidifies and hardens. The hardened melted mix becomes individual pellets, each of which assumes the shape of the form pockets 76. The solidified mixture exiting the cooling station forms solid pellets 94. The solid pellets 94 are transported on the second conveyor belt 70 toward the drive pulley 72.

As schematically illustrated in FIG. 4, the drive pulley 72 is a gear wheel with a plurality of teeth 73 protruding from a center portion of the gear wheel. In one aspect of the invention, the gear teeth 73 are spaced equidistantly about the circumference of the gear wheel 72 at about the same distance as the pockets 76 are spaced from each other. As the second conveyor belt 70 moves over the gear wheel 72, the teeth 73 push against the underside of the pockets 76 and force the pellets 94 out of the pockets.

Figure 5:
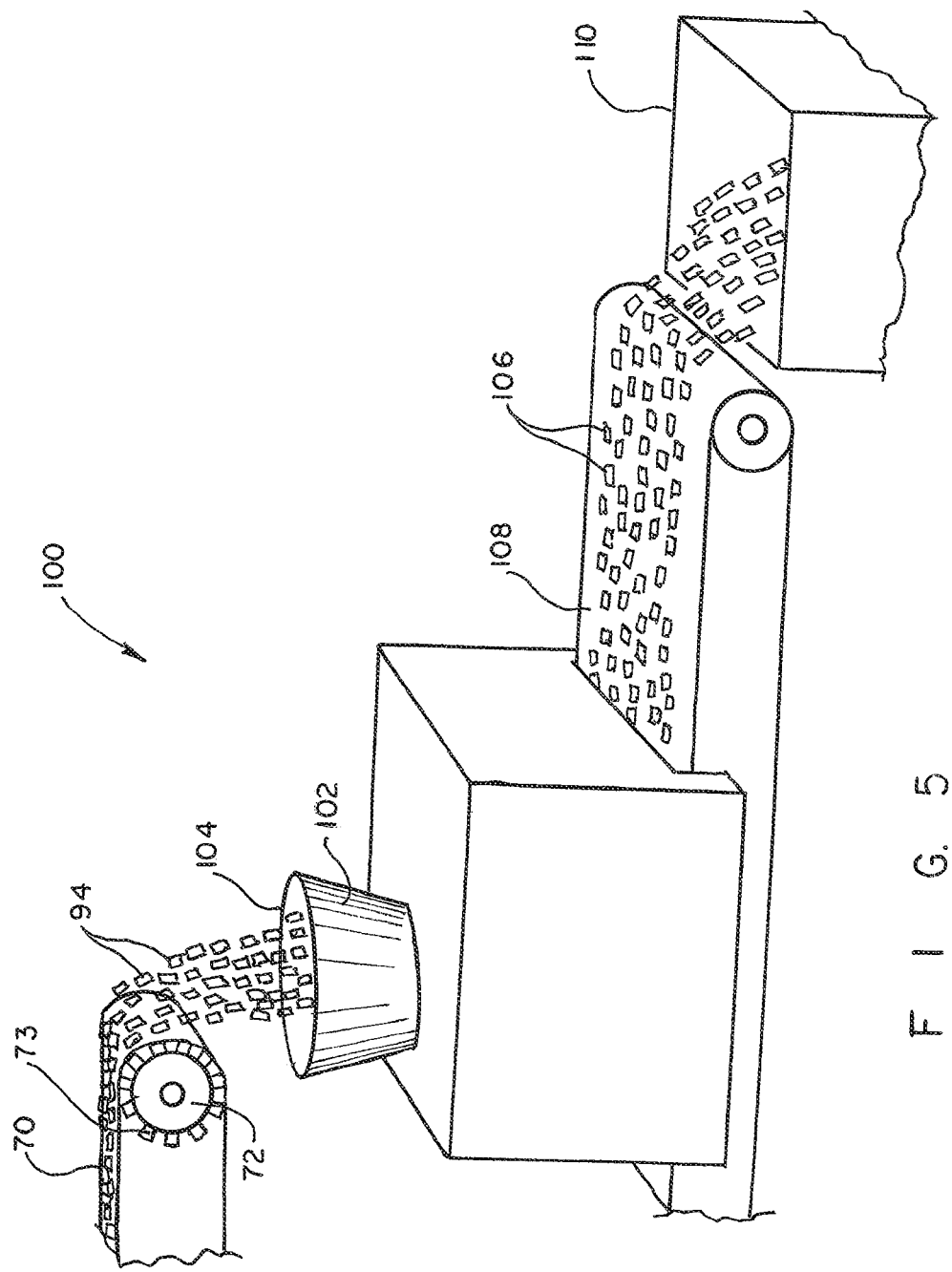
FIG. 5 is a schematic view of a packing section of the system of the present invention.

The extruded solid pellets 94 are transported to a packing section 100 schematically illustrated in FIG. 5. The packing section 100 comprises a weighing station 102, which can be formed as a hopper with a wide open top 104. The formed pellets 94 are deposited by gravity into the hopper 102 through the open top 104 and are weighed therein. A pre-determined quantity of the solid pellets 106 is released from the weighing station 102 onto a third belt conveyor 108. The third belt conveyor 108 moves the pellets 106 and loads them, by gravity, into a shipping container 110. The shipping container 110 can be a box or a sack, depending on the manufacturer's preference.

The road marking mix pellets packaged in the containers 110 are shipped to the site, where road markings need to be applied. The pellets are melted using conventional equipment and then extruded directly onto the road surface. The solid pellets produced by the system of the present invention save time and energy during a road marking process. The pellets are easily transported and deposited into the convention road marking machines, where they are melted, while retaining their homogenous characteristics.

The composition of the materials used to make pellets in the instant system generally follows government specification set forth in AASHTO M249-09. Each state or project could have special requirements or variations of this specification, but they usually reference this specification with changes. The specification provides compositional requirements and melt/flow characteristics. Things that could change are the Color Box or CIE color coordinates for yellow materials. Additionally, supplemental specification LADOTD 1015.10 can be used. The pellets can differ in size, pigment, as well as refractive index depending on the type and ratio of ingredients of the raw material mix.

The road marking mix may employ higher binder (25% or more), specialty application (audible and audible inverted), and applied by spray, ribbon extrude, spray extrude, screed extrude application techniques. Regardless of material or application, it will still meet the compositional requirements in the government specification M249-09.

Many changes and modifications can be made in the system of the present invention without departing from the spirit thereof. I, therefore, pray that my rights to the present invention be limited only by the appended claims.

We claim:

1. A system for pelletizing road marking material, comprising:
    a mixing section configured to mix thermoplastic binder, filler, and pigment materials suitable to form a dry mixture for formulating a thermoplastic road marking substance, said dry mixture comprising glass beads;
    a melting section positioned downstream from the mixing section and configured for heating the dry mixture to a pre-determined degree sufficient to melt the dry mixture and form a homogenous binder-filler-pigment melted thermoplastic road marking substance containing glass beads;
    a pelletizing section configured to receive the melted thermoplastic road marking substance and cool the melted thermoplastic road marking substance while forming a plurality of individual solid pellets of the thermoplastic road marking substance containing glass beads, the pelletizing section comprising a form belt conveyor provided with a plurality of spaced-apart form pockets, and wherein the melted thermoplastic road marking substance of road marking substance is deposited into the form pockets, as the melted thermoplastic road marking substance exits a dispensing conduit of the melting section;
    a spreader extending transversely to path of the form belt conveyor, positioned adjacent an idler pulley of the form belt conveyor and immediately adjacent the dispensing conduit, and running along top of the form pockets and is configured to evenly distribute the melted thermoplastic road marking substance in the form pockets; and
    a packing section configured to package the solid pellets of the thermoplastic road marking substance into shipping containers.

2. The system of claim 1, wherein the mixing section comprises a first belt conveyor and a plurality of storage containers mounted adjacent the first belt conveyor, each of said storage containers being configured to dispense a pre-determined quantity of a dry ingredient to form the dry mixture.

3. The system of claim 1, said melting section comprising a computer-controlled melting unit, said melting unit being configured to heat and melt the dry mix and form a homogenous binder-filler-pigment mixture of road marking substance containing glass beads.

4. The system of claim 3, wherein said melting unit comprises a microwave unit.

5. The system of claim 3, wherein said melting unit comprises a gas-powered burner unit.

6. The system of claim 3, wherein said melting unit comprises an agitator configured to stir the dry mixture during melting.

7. The system of claim 3, wherein said melting unit is configured to heat the dry mixture to a temperature of between 300 degrees Fahrenheit and 450 degrees Fahrenheit.

8. The system of claim 3, wherein said melting unit comprises the dispensing conduit and an electronically-controlled valve for controlling extrusion of melted mixture of road marking substance.

9. The system of claim 8, wherein said form belt conveyor is positioned adjacent the dispensing conduit.

10. The system of claim 9, said pelletizing section comprising a cooling station mounted adjacent the form belt conveyor, said cooling station is configured to cool the melted mixture of road marking substance deposited into the form pockets to a degree below 115 degrees Fahrenheit and solidify the melted thermoplastic road marking material, while the thermoplastic road marking material assumes configuration of pellets corresponding in shape to the form pockets.

11. The system of claim 10, said cooling station comprising a spray unit mounted above the form belt conveyor, said spray unit being configured to spray a cooling substance over the form pockets.

12. The system of claim 11, comprising a coolant collection tray mounted below the form belt conveyor, said coolant collection tray being configured to collect the coolant substance sprayed over the form pockets.

13. The system of claim 12, the cooling station comprising a pump configured to recirculate the coolant substance between the collection tray and the spray unit.

14. The system of claim 10, said form belt conveyor comprising a drive wheel having a plurality of gear teeth, and wherein the gear teeth are configured to push against an underside of the form pockets and cause solid pellets of the thermoplastic road marking substance to be released from the form pockets.

15. The system of claim 14, said packing station comprising a third belt conveyor configured to transport solid pellets of the thermoplastic road marking substance to shipping containers.

\* \* \* \* \*